No. 681,219. Patented Aug. 27, 1901.
B. C. HICKS.
MOTOR VEHICLE.
(Application filed Oct. 22, 1900.)
(No Model.) 3 Sheets—Sheet 3.

Witnesses:

Inventor:
Bohn C. Hicks,
By Thomas V. Sheridan
Att'y

UNITED STATES PATENT OFFICE.

BOHN CHAPIN HICKS, OF CHICAGO, ILLINOIS, ASSIGNOR TO THE HICKS MOTOR CYCLE COMPANY, OF SAME PLACE.

MOTOR-VEHICLE.

SPECIFICATION forming part of Letters Patent No. 681,219, dated August 27, 1901.

Application filed October 22, 1900. Serial No. 33,934. (No model.)

*To all whom it may concern:*

Be it known that I, BOHN CHAPIN HICKS, a citizen of the United States, residing at Chicago, in the county of Cook and State of Illinois, have invented certain new and useful Improvements in Motor-Vehicles, of which the following is a specification.

My invention relates to that class of vehicles known as "motor-vehicles"—that is, vehicles which carry their own propelling force—and particularly to the construction of the running-gear and frame thereof, all of which will more fully hereinafter appear.

The principal object of the invention is to make a simple, economical, and efficient running-gear for motor-vehicles.

A further object is to make a flexible running-gear for motor-vehicles of such construction and arrangement as to permit the vehicle to ride over or "take" obstructions in the road with the least possible danger of injury to the mechanisms.

Further objects will appear from an examination of the drawings and the following description and claims.

The invention consists principally in the combination of a main frame carrying a single central driving-wheel, a front axle secured to the front portion of such frame and carrying the usual supporting guiding-wheels, and a two-part rear axle pivotally secured to the main frame forward of the driving-wheel and carrying at least two supporting-wheels.

The invention consists, further and finally, in the features, combinations, and details of construction hereinafter described and claimed.

Figure 1:
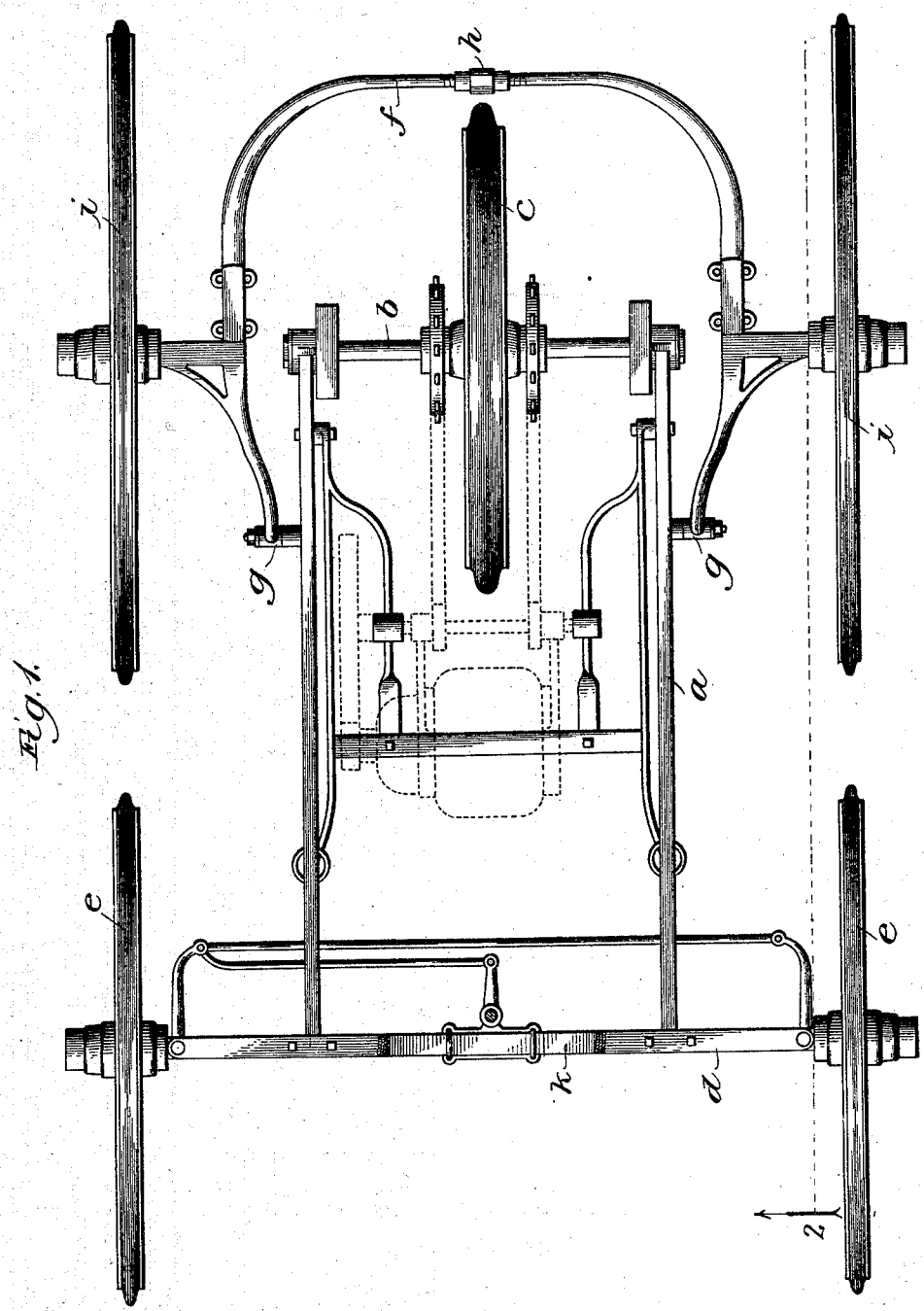
Figure 2:
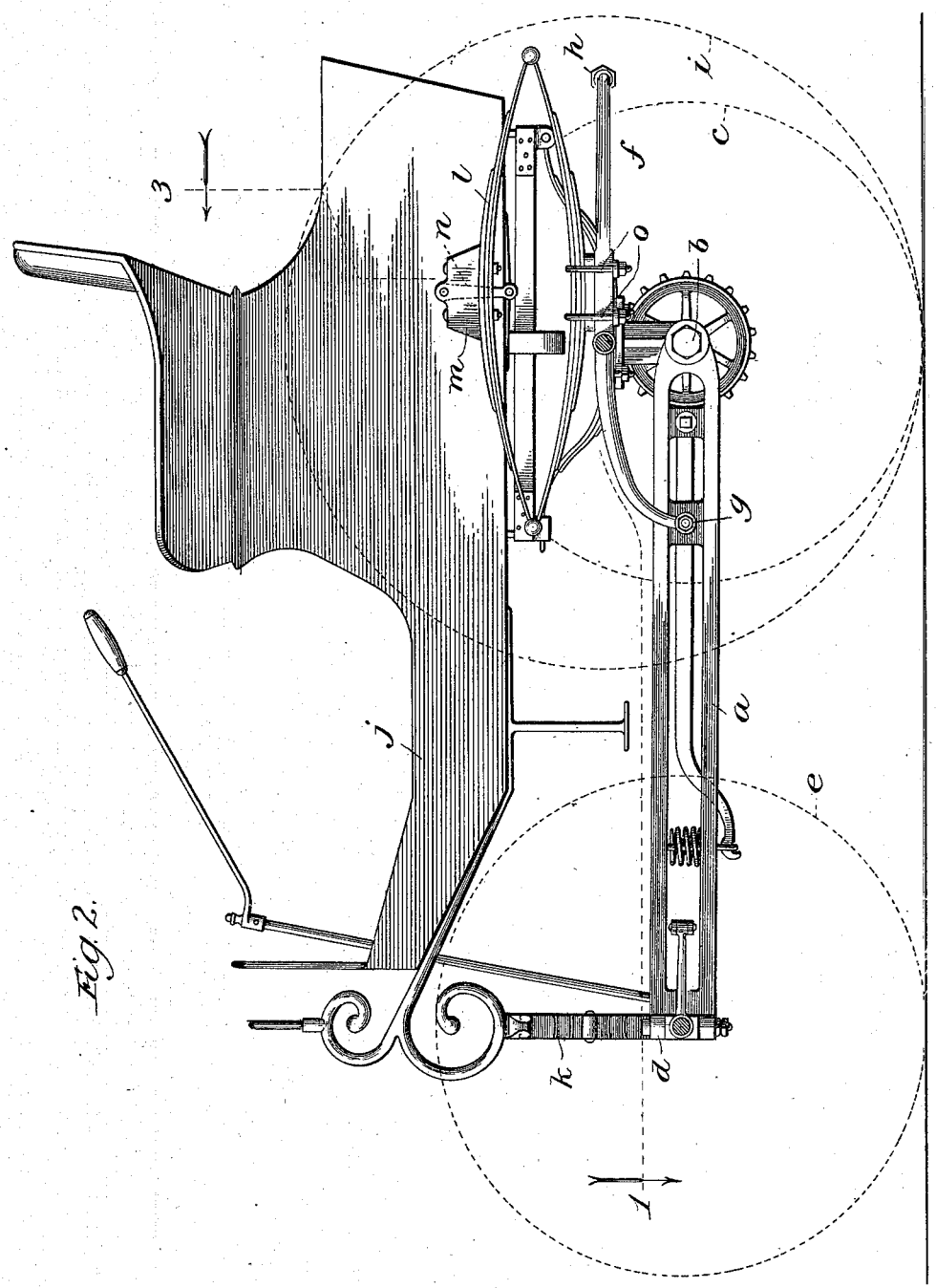

In the accompanying drawings, Figure 1 is a plan view of a running-gear constructed in accordance with these improvements; Fig. 2, a vertical sectional elevation of a vehicle constructed in accordance with my improvements, taken on line 2 of Fig. 1, looking in the direction of the arrow; and Fig. 3, a rear end elevation, partly in section, taken on line 3 of Fig. 2, looking in the direction of the arrow.

In the art to which this invention relates it is well known that it is the aim of all designers, inventors, and manufacturers to provide a vehicle which will be econominal to construct and efficient in operation and one that will be able to take the ordinary irregularities of the road with the least injurious effect on the vehicle. To accomplish this result, this invention has been principally designed by providing a motor-vehicle in which there is a flexible running-gear made in two or more parts, all pivotally secured together, so as to enable it to withstand the irregularities of the road and permit of its being driven with the least amount of power and injury to the same, all of which will be apparent to those skilled in the art after an examination of the drawings and the following description and claims.

In constructing a vehicle in accordance with these improvements I make what I term a "main frame" $a$, in which is rotatably mounted at the rear end an axle $b$, carrying the driving or traction wheel $c$. This main frame is secured at its front portion to a front axle $d$, which in turn is provided with the usual supporting guiding-wheels $e$, by which the front portion of the vehicle is supported and steered.

It is desirable that rear supporting-wheels be provided and so arranged as to permit the vehicle to take the undulations or irregularities of the road and turn corners in a manner that will minimize the shock or jar and consequent wear of parts. To accomplish this result, a two-part axle $f$ is provided, which is substantially U-shaped when viewed in plan view, as shown in Fig. 1. The free ends of this two-part axle are pivoted to the main frame at $g$ at a point forward of the driving-axle and between it and the front axle, and are pivotally joined together at or near the center by means of a union $h$, which has threaded engagement with the right and left hand threads, respectively, on the two-part axle, which permits both portions of the axle to have independent rotations or oscillations in the union. The axle is provided with two side supporting-wheels $i$, arranged in line with and outside of the central traction or driving wheels $c$. It is desirable for various reasons that these wheels be made of larger diameter than the driving-wheel, so as to bring the axes of such wheels above the axis of the driving-wheel, but cause it to remain in the same vertical plane, as shown in Fig. 2. By this arrangement it will be seen that the front wheels may have the independent vertical movement of the other three wheels, and the traction and side supporting wheels have movements in a vertical plane independent of each other and of the front supporting and guiding wheels, all of which will be appreciated by those skilled in the art.

Figure 3:
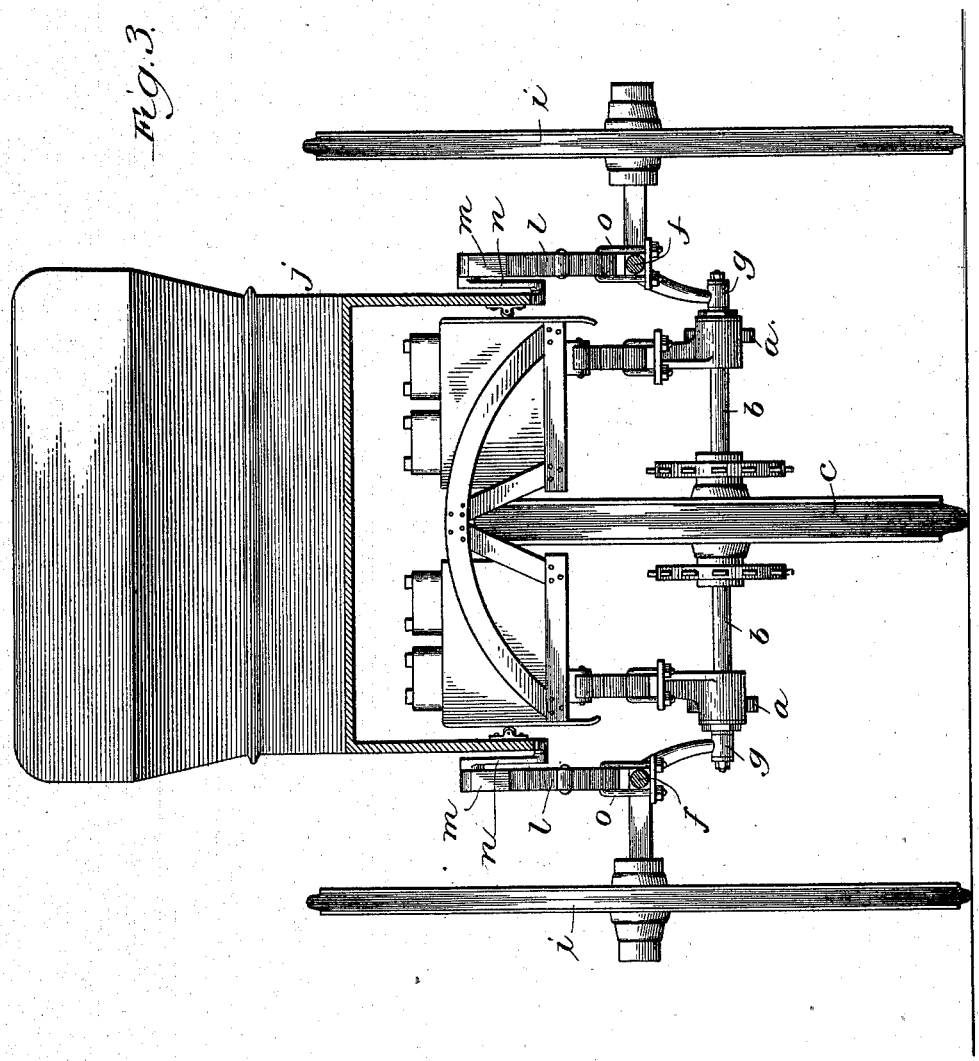

It is desirable that the wagon-body $j$ be supported in an adjustable as well as yielding manner upon the rear axle particularly as well as upon the front axle. In order to accomplish this, it is provided with a spring $k$ and yieldingly supported upon the front axle by means thereof. The rear of the body portion is supported upon the two-part rear axle by means of the elliptical springs $l$, placed at each side of and longitudinally parallel with the body portion. As shown in Figs. 2 and 3 particularly, the connection between the elliptical spring, side supporting-springs, and body portion is flexible—that is, the body portion is pivotally connected to the upper portion of the elliptical springs on a block $m$ by means of a link $n$, which is pivotally mounted therein as well as in the lower portion of the wagon-body. This permits a swinging motion of the body independent of the spring, and at the same time permits an adjustment of these elliptical springs upon the two-part axle, as will be more fully hereinafter set forth.

It is very desirable that the position of the load of the body upon the rear axle may be adjusted to meet various circumstances and conditions. To accomplish this result, these side supporting elliptical springs are adjustably secured to the rear axle, as shown in Figs. 2 and 3, by means of clips $o$. An inspection of Fig. 2 will show that these clips may be moved longitudinally upon the side portions of the two-part axle, so as to span the axes of the side supporting-wheels, or be placed forward or rearward on the same. In the drawings they are shown as placed to the rear of the axes of the side supporting-wheels; but it is evident that either of the other two positions may be obtained by merely loosening the clips and changing the position of the springs thereon, the body of the vehicle being at all times in pivotal connection with the upper portion of the elliptical springs.

The parts shown and described in this specification, but not claimed herein, are reserved for and intended to be claimed in an application or applications to be filed simultaneously herewith, and I do not desire to be understood as abandoning any part or portion of such mechanisms.

I claim—

1. In a vehicle of the class described, the combination of a main frame, a central driving-wheel pivotally mounted therein, a front axle carrying steering-wheels secured to the front portion of the frame, and a two-part axle carrying two side supporting-wheels outside of the central driving-wheel and pivotally secured to the main frame at a point forward of the axis of the driving-wheel, substantially as described.

2. In a vehicle of the class described, the combination of a main frame, a driving-axle provided with a central driving-wheel rotatably mounted at or near the rear portion of the main frame, a front axle carrying supporting guiding-wheels secured to the main frame at or near the front portion, a two-part axle pivotally secured to the main frame at a point forward of the driving-axle and provided with two side supporting-wheels mounted in alinement with and outside of the central driving-wheel, and a union connecting the two-part rear axle together, substantially as described.

3. In a vehicle of the class described, the combination of a main frame, a driving-axle provided with a central driving-wheel rotatably mounted in the main frame at or near the rear portion, a front axle secured to the main frame at or near the front portion and provided with two supporting guiding-wheels, a two-part rear axle pivotally secured together and substantially U-shaped in plan view pivotally secured to the main frame at a point forward of the driving-axle and provided with two side supporting-wheels outside of and substantially in alinement with the central driving-wheel, substantially as described.

4. In a vehicle of the class described, the combination of a main frame, a driving-axle provided with a central driving-wheel rotatably mounted in the main frame at or near the rear portion, a front axle secured to the main frame and provided with two supporting steering-wheels, a two-part U-shaped rear axle pivotally secured together and to the main frame at a point forward of the driving-axle, the axis of the two-part axle being in the same vertical plane in alinement with and above the axis of the driving-axle and provided with two outside supporting-wheels, substantially as described.

5. In a vehicle of the class described, the combination of a main frame, a driving-axle provided with a single central driving-wheel rotatably mounted in the main frame at or near the rear portion, a front axle provided with steering-wheels secured to the main frame at or near the front portion, a substantially U-shaped rear axle pivotally secured to the main frame at a point forward of the driving-axle, a wagon-body, and side supporting-springs for the wagon-body longitudinally arranged and adjustably mounted upon the side portions of the U-shaped supporting rear axle, substantially as described.

6. In a vehicle of the class described, the combination of a running-gear, two side supporting elliptical springs adjustably mounted upon such running-gear, a wagon-body, and links pivotally connected to the upper portion of the side supporting-springs and the wagon-body to pivotally and yieldingly hold such body in position, and means for adjusting the springs forward and backward, substantially as described.

7. In a vehicle of the class described, the combination of a main frame carrying the traction-wheel, a substantially U-shaped rear supporting-axle pivotally secured to the main frame, an elliptical spring mounted at each side and upon the side portions of the U-shaped rear axle, a wagon-body, and links pivotally connecting the upper portion of the side springs and the lower portion of the body together, substantially as described.

BOHN CHAPIN HICKS.

Witnesses:
　THOMAS F. SHERIDAN,
　ANNIE C. COURTENAY.